United States Patent
Kuo

(10) Patent No.: US 6,868,583 B2
(45) Date of Patent: Mar. 22, 2005

(54) LOCKING PIN

(75) Inventor: Chung-Hsien Kuo, Pan-Chiao (TW)

(73) Assignee: Chaw Khong Technology Co., Ltd., Taipei (TW)

( * ) Notice: Subject to any disclaimer, the term of this patent is extended or adjusted under 35 U.S.C. 154(b) by 0 days.

(21) Appl. No.: 10/388,581

(22) Filed: Mar. 17, 2003

(65) Prior Publication Data
US 2004/0181910 A1 Sep. 23, 2004

(51) Int. Cl.$^7$ .............................. B62B 7/00; B25G 1/04
(52) U.S. Cl. ........................ 16/405; 16/113.1; 190/115; 280/47.371; 280/655.1
(58) Field of Search ................................ 16/113.1, 429, 16/405; 190/115, 18 A; 280/655.1, 655, 47.371, 47.17, 47.315; 403/92, 93, 97, 101, 325; 81/177.2, 489; 15/143.1, 144.1, 144.3, 144.4

(56) References Cited

U.S. PATENT DOCUMENTS

| | | | | | |
|---|---|---|---|---|---|
| 5,460,393 A | * | 10/1995 | Tsai | .......................... | 280/655 |
| 5,488,756 A | * | 2/1996 | Hsieh | ......................... | 16/113.1 |
| 6,332,241 B1 | * | 12/2001 | Kuo | ........................... | 16/113.1 |
| 6,347,432 B1 | * | 2/2002 | Kuo | ........................... | 16/113.1 |
| 6,357,080 B1 | * | 3/2002 | Tsai | ........................... | 16/113.1 |
| 6,409,207 B1 | * | 6/2002 | Kuo | ........................ | 280/655.1 |
| 6,484,362 B1 | * | 11/2002 | Kuo | ........................... | 16/113.1 |
| 6,609,271 B2 | * | 8/2003 | Kuo | ........................... | 16/113.1 |

FOREIGN PATENT DOCUMENTS

| | | | | | |
|---|---|---|---|---|---|
| DE | 4019081 A1 | * | 2/1991 | .......... | B62B/01/04 |
| FR | 2418729 A | * | 11/1979 | .......... | B62B/01/12 |

* cited by examiner

Primary Examiner—Chuck Y. Mah
(74) Attorney, Agent, or Firm—Troxell Law Office, PLLC

(57) ABSTRACT

A metal locking pin of locking device for a wheeled luggage provides a projected plastic contact member at a front most end thereof for both increasing structural strength and eliminating the noise when the locking pin is in a position of compression and being retracted to disengage from the aperture for being adapted to extend or retract the handle assembly with the plastic contact member in sliding contact with an inner surface of the support tube. Thus the invention can achieve a smooth retracting or extending operation of the handle without noise.

12 Claims, 5 Drawing Sheets

LOCKING PIN

BACKGROUND OF THE INVENTION

1. Field of the Invention

The present invention relates to wheeled luggage and more particularly to an improved locking pin of locking device for wheeled luggage.

2. Description of Related Art

A conventional wheeled luggage is equipped with two sets of wheel(s) and a retractable handle assembly which is either locked in a predetermined extended position while towing along ground or retracted to bezel on the top of luggage in an unused position. Such wheeled luggage is popular among travelers. In a typical extending operation, user may press a push button by grasping handle grip for causing locking pin to clear from an aperture of support tube through an activated flexible (or rigid) connection member such as steel cable which is coupled between the push button and the locking pin. Then it is possible of pulling sliding tube until a desired length of handle is reached. Finally, user may release push button to secure locking pin in another aperture for finishing the handle extension operation. Also, retracting operation is similar to above extending operation.

A portion of handle assembly of a wheeled luggage incorporating a conventional locking device is shown in FIGS. 5 and 6. The handle assembly comprises a handle grip 1 having a push button 2 on the intermediate portion, a sliding tube 3 extended downward from one end of handle grip 1, a support tube 4 for permitting sliding tube 3 to slide therein and having a bottom end fixedly coupled to bottom of luggage and a plurality of apertures (e.g., apertures 4B and 4C) on surface, a locking device 5 on lower portion of sliding tube 3, a flexible (or rigid) connection member such as steel cable 7 coupled between push button 2 and locking device 5, a locking pin 9 on lower end of locking device 5, and a spring 8 biased against inner end of locking pin 9 which is either projected into and locked in one of apertures (e.g., aperture 4B) in a normal position or disengaged from the aperture temporarily for being ready to extend or retract the handle. It is understood that almost all weight of luggage is borne on the engaged point of locking pin 9 and aperture (e.g., aperture 4B in FIG. 5) while towing. Hence, force exerted on locking pin 9 is huge. This is particularly true for a large luggage packed with personal items. In response, most locking pins 9 are formed of metal material for increasing structural strength thereof. However, the previous design suffered from several disadvantages. For example, loud sound or noise may be produced in retracting or extending operation due to a large friction between locking pin 9 and inner surface 4A of support tube 4. Further, inner surface 4A tends to wear. Hence, the structural strength of handle assembly may degrade after a long period of time of use.

Thus, it is desirable to provide an improved locking pin of locking device for wheeled luggage in order to overcome the above drawbacks of prior art.

SUMMARY OF THE INVENTION

It is therefore an object of the present invention to provide a metal locking pin of locking means on a lower portion of a sliding tube of a retractable handle assembly of a wheeled luggage, wherein a projected plastic contact member is provided at a front most end thereof for both increasing structural strength and eliminating the noise when the locking pin is in a position of compression and being retracted to disengage from the aperture for being adapted to extend or retract the handle assembly with the contact member in sliding contact with an inner surface of the support tube. Thus the invention can achieve a smooth retracting or extending operation of the handle without noise.

The above and other objects, features and advantages of the present invention will become apparent from the following detailed description taken with the accompanying drawings.

DETAILED DESCRIPTION OF THE PREFERRED EMBODIMENTS

Figure 1:
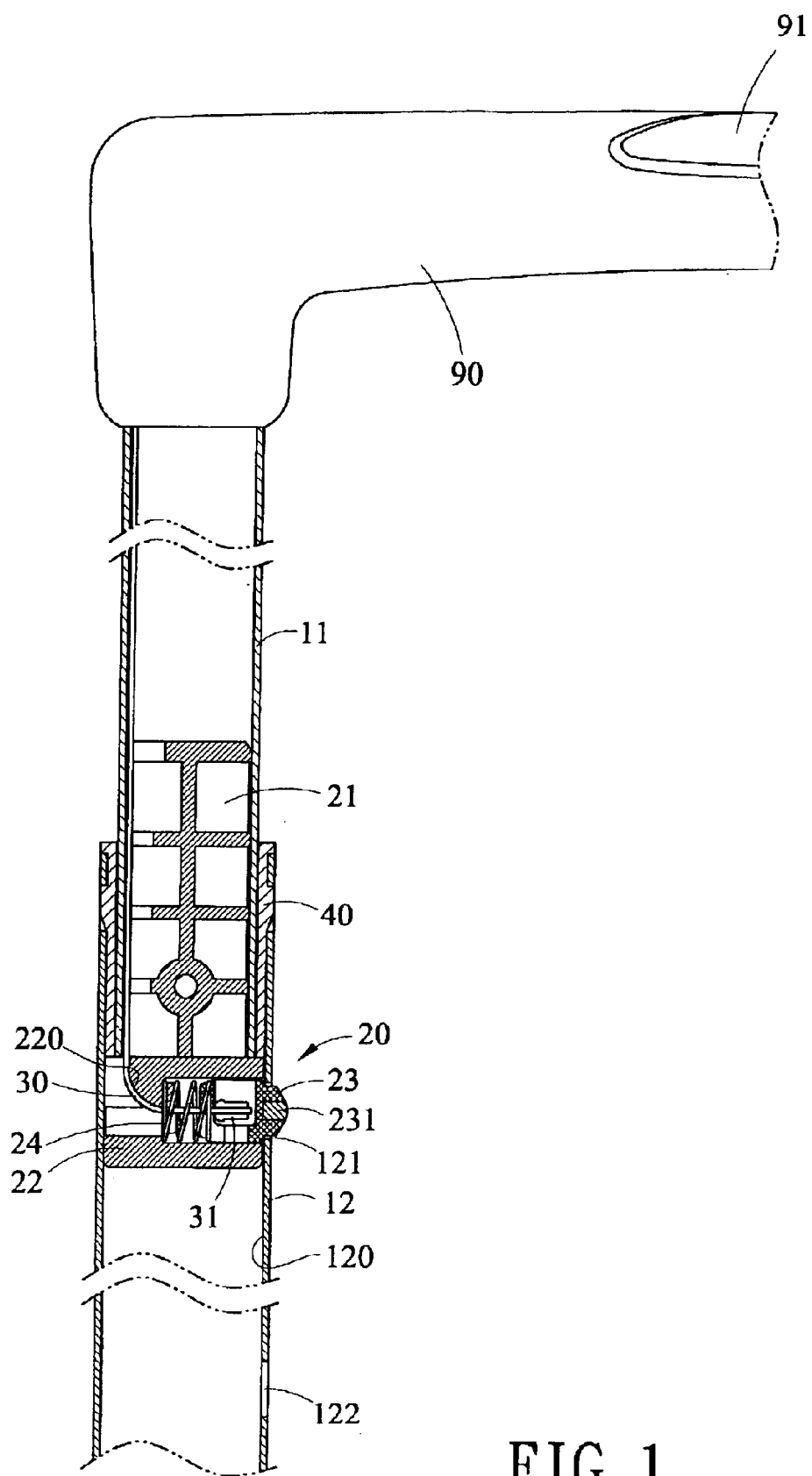
FIG. 1 is a cross-sectional view of a portion of handle assembly incorporating a first preferred embodiment of locking pin according to the invention where locking pin is projected in a locked position.
Figure 2:
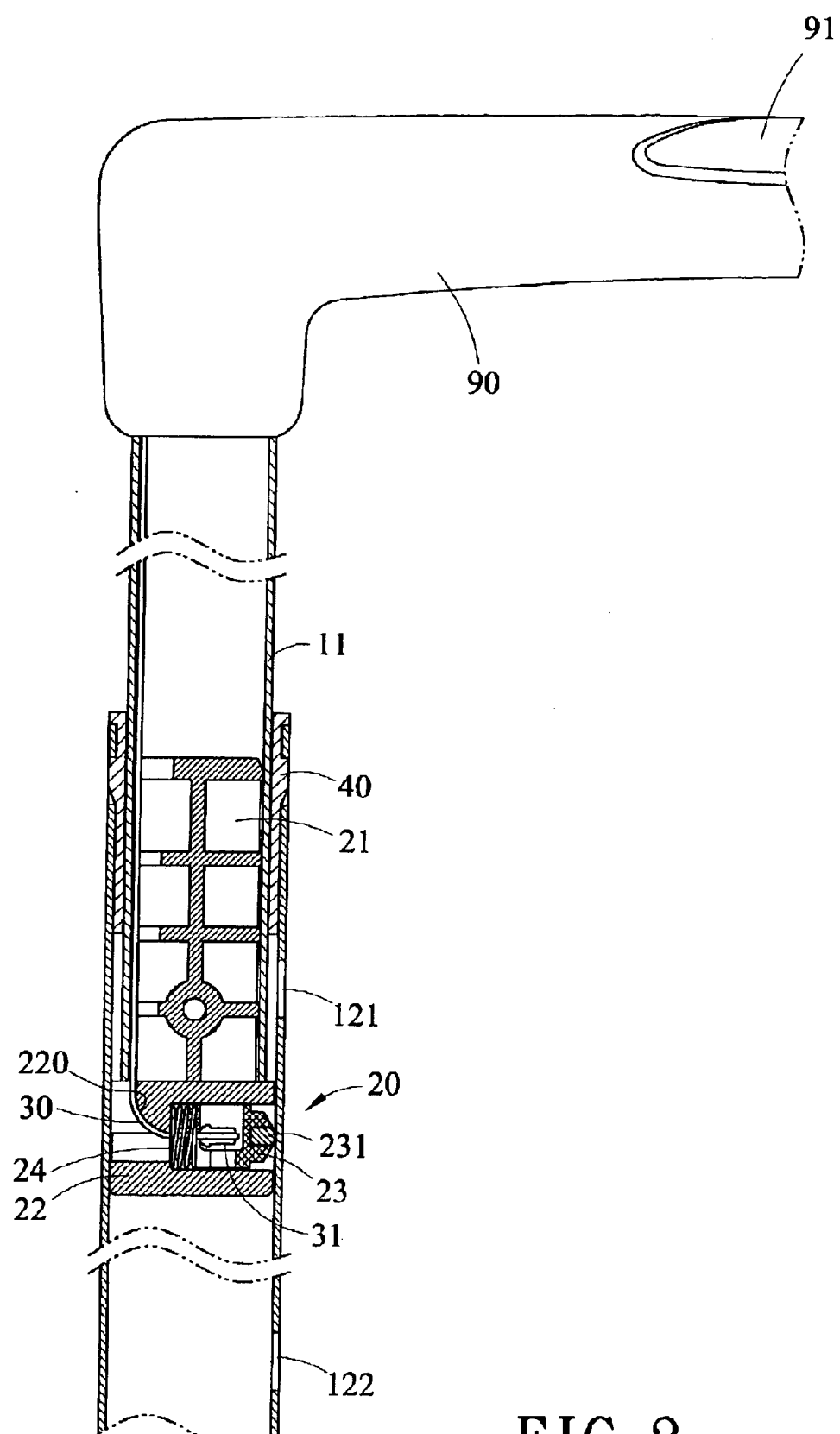
FIG. 2 is a view similar to FIG. 1 where locking pin is retracted in an unlocked position.

Referring to FIGS. 1 and 2, there is shown a portion of handle assembly incorporating a first preferred embodiment of locking pin according to the invention. The handle assembly comprises a handle grip 90 having a push button 91 on the intermediate portion, a sliding tube 11 extended downward from a end of handle grip 90, a support tube 12 for permitting sliding tube 11 to slide therein and having a bottom end fixedly coupled to bottom of luggage and a plurality of apertures (e.g., apertures 121 and 122) on surface, a locking device 20 on a lower portion of sliding tube 11, a flexible (or rigid) connection member 30 such as steel cable coupled between push button 91 and locking device 20, and an internal sleeve 40 secured to the upper portion of support tube 12 for preventing sliding tube 11 from pulling out of support tube 12. Locking device 20 comprises an upper portion 21, a lower portion 22, a block 31 on lower end of connection member 30 received in lower portion 22, a locking pin 23 projected from block 31, a curved portion 220 on lower portion 22 with connection member 30 passed thereon, and a spring 24 biased against inner end of block 31 wherein locking pin 23 is either projected into and locked in one of apertures (e.g., aperture 121 in FIG. 1) in a normal position or disengaged from the aperture 121 temporarily for being ready to extend or retract the handle (FIG. 2).

Figure 3:
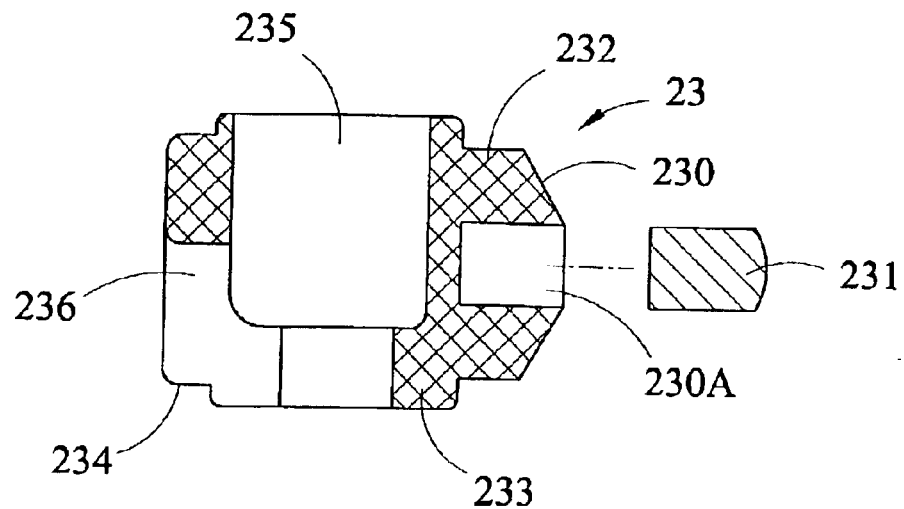
FIG. 3 is a cross-sectional view of FIG. 1 locking pin with contact member broken away.
Figure 4:
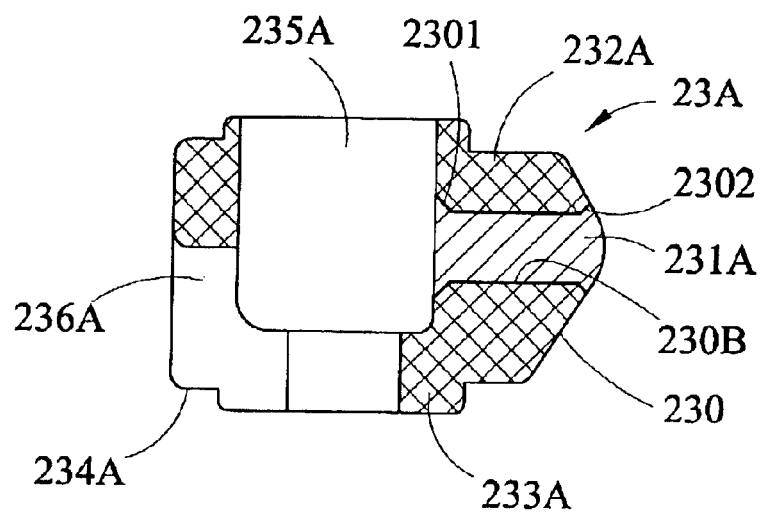
FIG. 4 is a cross-sectional view of a second preferred embodiment of locking pin according to the invention.
Figure 5:
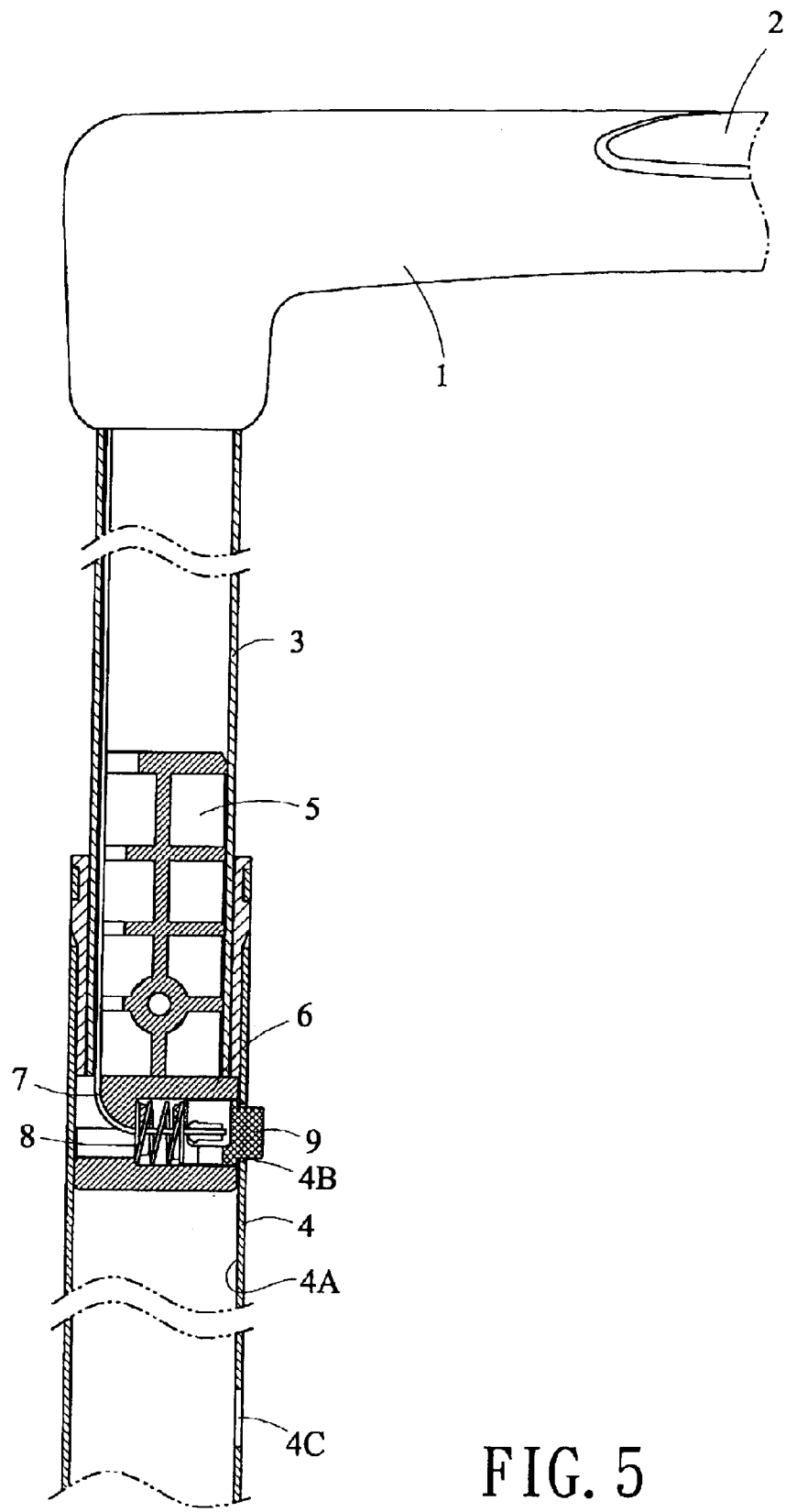
FIG. 5 is a cross-sectional view of a portion of handle assembly incorporating a conventional locking pin where locking pin is projected in a locked position.
Figure 6:
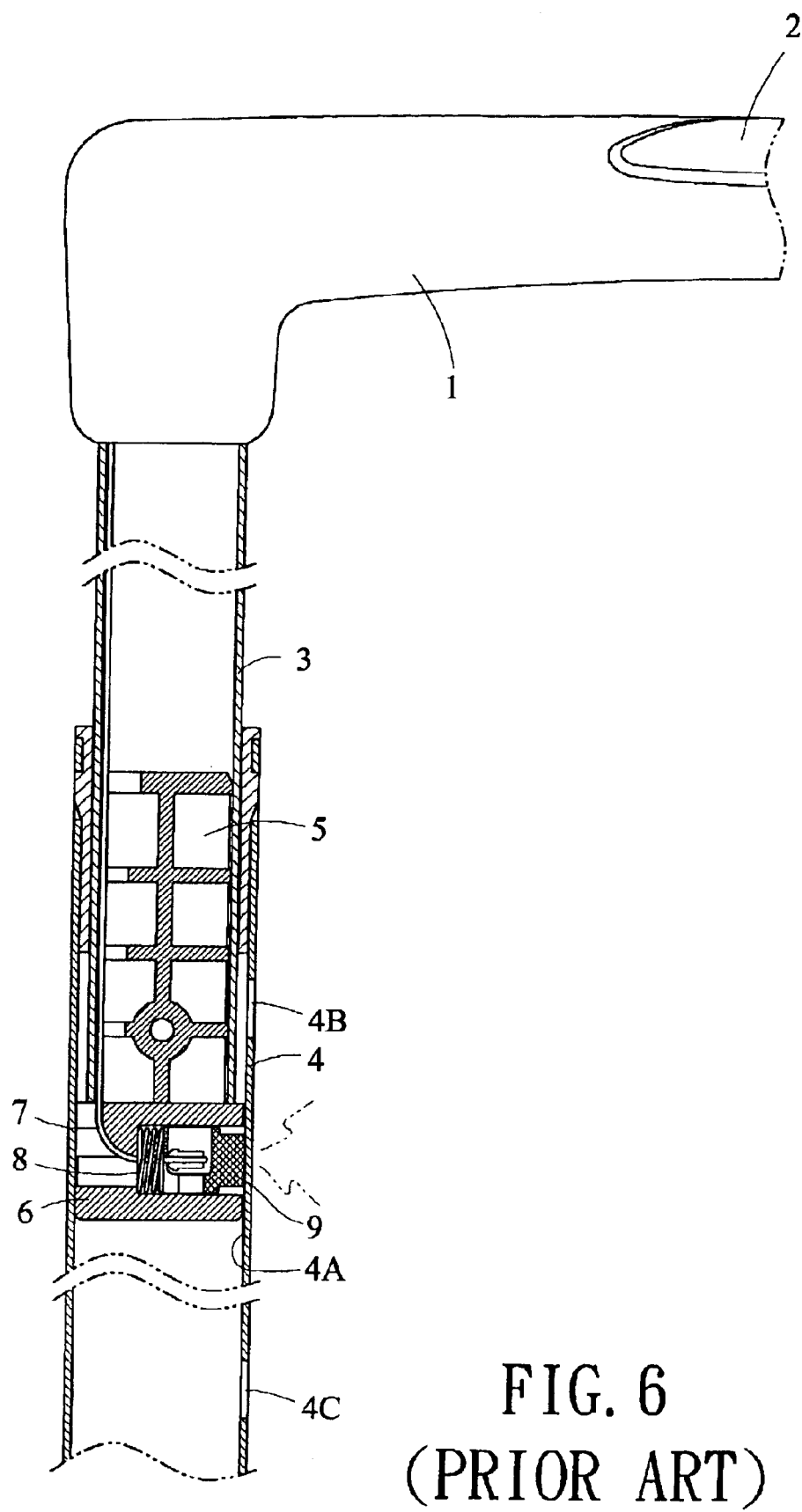
FIG. 6 is a view similar to FIG. 5 where locking pin is retracted in an unlocked position.

The characteristics of the invention is the improvement of locking pin 23. In detail, by referring to FIG. 3, locking pin 23 comprises a projection 232 having a curved front surface 230 for facilitating an insertion into one of apertures of support tube 12 and reducing friction between locking pin 23 and inner surface 120 of support tube 12 while retracting or extending the handle, a lateral cavity 230A on the center of projection 232, a central larger diameter portion 233, a rear smaller diameter portion 234 with spring 24 received therein, a longitudinal recess 235 on larger diameter portion 233 with block 31 received therein, and a separate contact member 231 having a knurled front surface secured into cavity 230A by clinging wherein the frontmost smooth end of contact member 231 is slightly projected from the curved front surface 230. It is important to note that locking pin 23 is formed of metal except contact member 231 which is formed of nonmetal material as detailed later. With this configuration, only contact member 231 is in sliding contact with inner surface 120 of support tube 12 while retracting or extending the handle. Hence, friction between locking pin 23 and inner surface 120 of support tube 12 and thus produced noises are much reduced in operation. Preferably, contact member 231 is formed of nonmetal material, such as, plastic material having durable, wear resistant, and lubricant features such as plastic steel, nylon, silicon and so on.

It is to be noted that the contact member 231, as described above, is pre-made in a form of solid state of plastic material and then inserted into the lateral cavity 230A, however, also it can be made in a form of semi-solid state of plastic material, such as silicon gel, it means that an appropriate amount of semi-state plastic material is filled in or dripped-into the lateral cavity 230A by applying an external force from a container having a semi-solid state plastic material contained therein. Preferably, upon having been solidified the appropriate amount of semi-solid of plastic material should be controlled to have the outer end of the contact member 231 slightly projected from the curved surface 230 of the locking pin 23, as mentioned above.

It is also to be noted that the above locking device 20 can also be applicable to a single handle grip having a push button with a single sliding tube and a single supporting tube by using the same half of the above structure. Thus the drawings and related descriptions are therefore omitted for simplicity.

While the invention herein disclosed has been described by means of specific embodiments, numerous modifications and variations could be made thereto by those skilled in the art without departing from the scope and spirit of the invention set forth in the claims.

What is claimed is:

1. A retractable handle assembly for wheeled luggage comprising a handle grip having a push button, a pair of sliding tubes each extended downward from a lower end of the handle grip, a pair of support tubes each for permitting the sliding tube to slide therein and having a plurality of apertures on a peripheral surface, a pair of connection members each having an upper end coupled to the push button, and a lower end, and a pair of locking means each on a lower portion of each of the sliding tubes, each locking means coupled to the lower end of each of the connection members, each locking means comprising a body, an upper portion of the body connected within the lower portion of the sliding tube, a metal locking pin received in a lower portion of the body, the locking pin having a projected nonmetal contact member at most front portion, and a spring in the lower portion of the body biased against an inner end of the locking pin wherein in a first position when the push button is not pressed, the spring is expanded and not urged by the lower end of the connection member and the locking pin is projected into one of the apertures for locking, and in a second position when the push button is pressed, the connection member is pulled by the push button, and the spring is compressed by the lower end of the connection member and the locking pin is retracted to disengage from the aperture for being adapted to extend or retract the handle assembly with the contact member in sliding contact with an inner surface of the support tube.

2. The handle assembly of claim 1, wherein said metal locking pin has a curved front surface having a lateral cavity on the center thereof and a nonmetal contact member having a knurled front surface secured into the cavity.

3. The handle assembly of claim 1, wherein the contact member is made in a form of solid state of plastic material separately prior to securing to the locking pin by clinging.

4. The handle assembly of claim 1, wherein the contact member is formed with the locking pin by injection molding.

5. The handle assembly of claim 1, wherein the contact member is formed with the locking pin by filling an appropriate amount of semi-solid state plastic material into a cavity of the locking pin.

6. The handle assembly of claim 5, wherein the most front portion of the contact member is slightly projected from a curved front portion of the metal locking pin upon semi-solid state of plastic material having been solidified.

7. A retractable handle assembly for wheeled luggage having a single handle grip with a push button, a support tube having a plurality of apertures on a peripheral surface, a sliding tube slidable within the support tube and a locking means attached to a lower portion of the sliding tube, the locking means comprising a body, an upper portion of the body connected within the lower portion of the sliding tube, a metal locking pin received in a lower portion of the body, the locking pin having a projected nonmetal contact member at most front portion, and a spring in the lower portion of the body biased against an inner end of the locking pin wherein in a first position when the push button is not pressed, the spring is expanded and not urged by the lower end of the connection member and the locking pin is projected into one of the apertures for locking, and in a second position when the push button is pressed, the connection member is pulled by the push button, and the spring is compressed by the lower end of the connection member and the locking pin is retracted to disengage from the aperture for being adapted to extend or retract the handle assembly with the contact member in sliding contact with an inner surface of the support tube.

8. The handle assembly of claim 7, wherein said metal locking pin has a curved front surface having a lateral cavity on the center thereof and the plastic contact member having a knurled front surface secured into the cavity.

9. The locking pin of claim 7, wherein the contact member is made in a form of solid state of plastic material separately prior to securing to the locking pin by clinging.

10. The locking pin of claim 7, wherein the contact member is formed with the locking pin by injection molding.

11. The handle assembly of claim 7, wherein the contact member is formed with the locking pin by filling an appropriate amount of semi-solid state plastic material into a cavity of the locking pin.

12. The handle assembly of claim 11, wherein the most front portion of the contact member is slightly projected from a curved front portion of the metal locking pin upon semi-solid state of plastic material having been solidified.

* * * * *